United States Patent
Toyoda et al.

(10) Patent No.: US 9,080,081 B2
(45) Date of Patent: Jul. 14, 2015

(54) METHOD FOR MANUFACTURING DISPLAY DEVICE, AND TRANSPARENT RESIN FILLER

(75) Inventors: Tomoyuki Toyoda, Tochigi (JP); Yoshihisa Shinya, Tochigi (JP); Yasumi Endo, Tochigi (JP)

(73) Assignee: Dexerials Corporation, Tokyo (JP)

( * ) Notice: Subject to any disclaimer, the term of this patent is extended or adjusted under 35 U.S.C. 154(b) by 298 days.

(21) Appl. No.: 13/501,808

(22) PCT Filed: Oct. 12, 2010

(86) PCT No.: PCT/JP2010/067849
§ 371 (c)(1),
(2), (4) Date: Jun. 27, 2012

(87) PCT Pub. No.: WO2011/046102
PCT Pub. Date: Apr. 21, 2011

(65) Prior Publication Data
US 2012/0263964 A1    Oct. 18, 2012

(30) Foreign Application Priority Data
Oct. 13, 2009 (JP) .................................. 2009-236520

(51) Int. Cl.
*C09J 5/10* (2006.01)
*C09J 5/00* (2006.01)
*G02F 1/13* (2006.01)
*G09F 9/00* (2006.01)
*G02F 1/1333* (2006.01)

(52) U.S. Cl.
CPC ............... *C09J 5/00* (2013.01); *G02F 1/1303* (2013.01); *G09F 9/00* (2013.01); *G02F 2001/133311* (2013.01); *G02F 2001/133331* (2013.01); *G02F 2202/28* (2013.01)

(58) Field of Classification Search
CPC ........ G02F 2001/133331; G02F 2001/133311; G02F 2001/133325; G02F 1/1303; C09J 5/00; C09J 5/10
USPC .............................. 445/24, 25; 156/295, 305
See application file for complete search history.

(56) References Cited

U.S. PATENT DOCUMENTS

| 8,764,930 B2 * | 7/2014 | Shibata et al. ................. 156/295 |
| 2004/0126592 A1 * | 7/2004 | Shibahara et al. ............. 428/441 |
| 2010/0098839 A1 * | 4/2010 | Toyoda et al. ................... 427/64 |

FOREIGN PATENT DOCUMENTS

| EP | 1973089 A1 | 9/2008 |
| EP | 2474478 A1 | 7/2012 |

(Continued)

OTHER PUBLICATIONS

Extended European Search Report issued in corresponding European Application No. 10823370.1 dated Jul. 24, 2013 (6 pages).

(Continued)

*Primary Examiner* — Mariceli Santiago
(74) *Attorney, Agent, or Firm* — Osha Liang LLP

(57) ABSTRACT

The present invention prevents air bubbles from being mixed in at the time of resin filling. In a supplying step (FIGS. 5D, 5E), a transparent resin filler is dispensed and supplied from supply means so that the transparent resin filler comes into contact with both of an image display panel and a front panel to draw a predetermined pattern, and the transparent resin filler is maintained in contact with both of the panels until drawing of the predetermined pattern is completed.

11 Claims, 9 Drawing Sheets

(56) References Cited

FOREIGN PATENT DOCUMENTS

| | | | |
|---|---|---|---|
| EP | 2474965 | A1 | 7/2012 |
| EP | 2487670 | A1 | 8/2012 |
| JP | 06-340453 | A | 12/1994 |
| WO | 2008/007800 | A1 | 1/2008 |
| WO | 2008/126893 | A1 | 10/2008 |
| WO | 2009/158474 | A2 | 12/2009 |

OTHER PUBLICATIONS

International Search Report issued in PCT/JP2010/067849, mailed on Nov. 9, 2010, 2 pages.

* cited by examiner

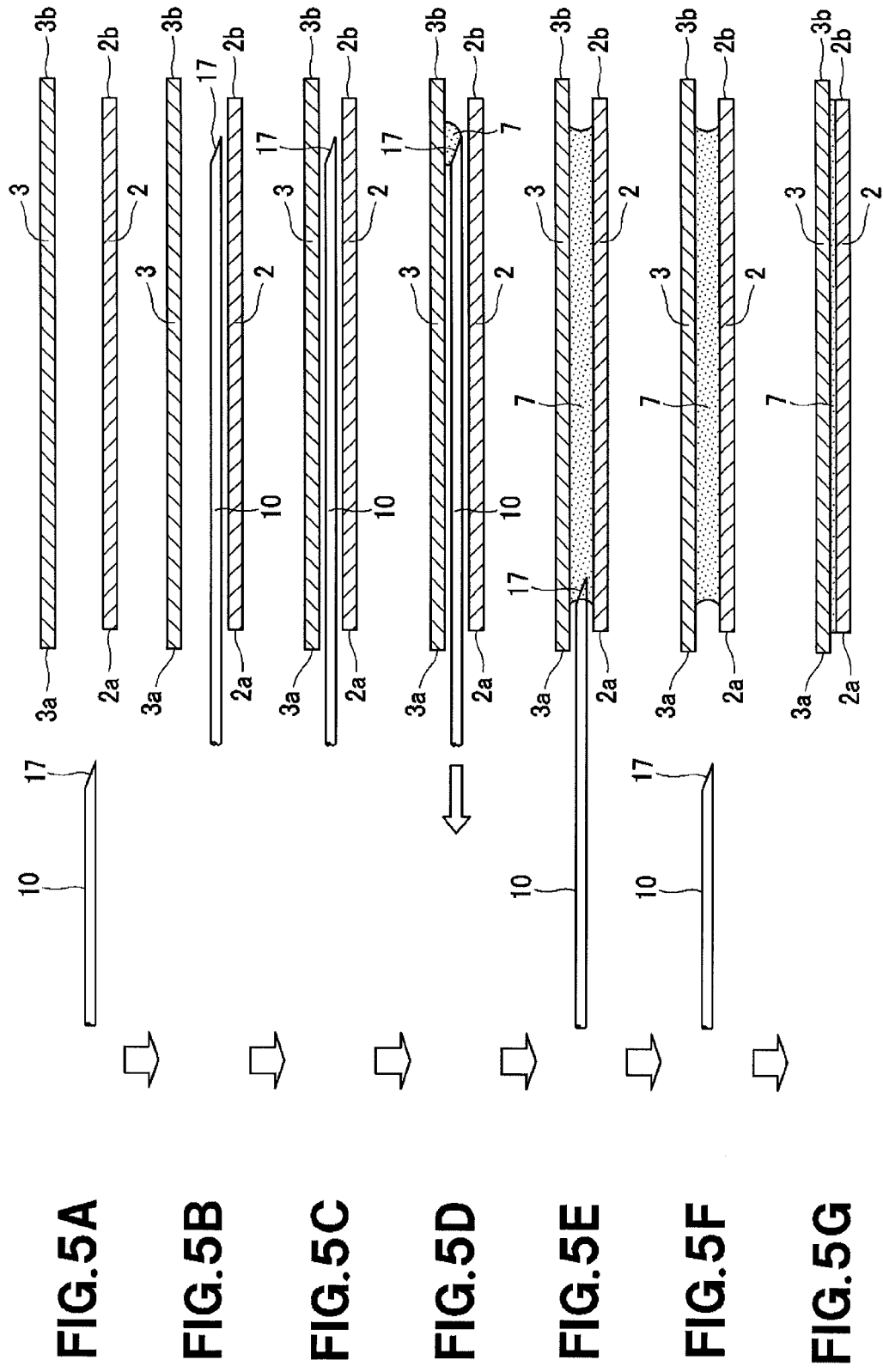

METHOD FOR MANUFACTURING DISPLAY DEVICE, AND TRANSPARENT RESIN FILLER

TECHNICAL FIELD

The present invention relates to a method for manufacturing a display device in which a transparent resin filler is filled between an image display panel and a front panel, and to the transparent resin filler.

The present application asserts priority rights based on JP Patent Application 2009-236520 filed in Japan on Oct. 13, 2009. The total contents of disclosure of the Patent Application of the senior filing date are to be incorporated by reference into the present application.

BACKGROUND ART

In related art, there has been proposed a display device in which a transparent resin filler is filled between an image display panel and a front panel. As the transparent resin filler, optical elastic resin having refractive-index matching property is used to improve viewability and impact resistance of a display device (For example, refer to Patent Literatures 1 and 2.).

As a resin filling method, there has been conventionally used a inversion method in which a resin is applied to either an image display panel or a front panel and made to hang down without opposing its own weight, then the image display panel and the front panel are bonded together so as to prevent air bubbles from being mixed in.

However, a larger display device inevitably needs more resin to be applied, and it is difficult to maintain a shape of the applied resin, therefore, when the resin applied side is inverted, resin drips at many points to form closed spaces, whereby air bubbles remain.

A tilting method in which resin is filled by tilting either an image display panel or a front panel can secure the uniformity of a resin amount at the time of application, however, it is difficult to secure the uniformity of a final resin thickness due to pushing out of resin. In addition, the panels are bonded together with bringing a lower side panel which resin is applied closer to an upper side panel, therefore air bubbles could remain.

As a filling method to solve these problems, there has been proposed a Gap-Dispense method to arrange an image display panel and a display panel in parallel with securing a predetermined Gap amount and fill the Gap with resin.

However, in the Gap-Dispense method, when resin is supplied, air bubbles are mixed in a transparent resin filler before drawing of a predetermined pattern is completed, thereby air bubbles sometimes remain in a display device.

RELATED TECHNICAL DOCUMENTS

Patent Documents

Patent Document 1: PCT International Publication No. WO2008/007800
Patent Document 2: PCT International Publication No. WO2008/126893

SUMMARY OF THE INVENTION

Problem to be Solved by the Invention

In view of the above problems, the present invention has been made, the present invention provides a method for manufacturing a display device, the method being capable of preventing residual air bubbles, and a transparent resin filler.

Means to Solve the Problem

In order to solve the above-mentioned problems, a method for manufacturing a display device according to an embodiment of the present invention is a method for manufacturing a display device in which a transparent resin filler is filled between an image display panel and a front panel, and comprises an arranging and inserting step of arranging the image display panel and the front panel with a predetermined gap, and inserting supply means between the image display panel and the front panel, the supply means configured to dispense and supply the transparent resin filler;
a supplying step of supplying the transparent resin filler from the supply means; a filling step of pressing the image display panel or the front panel to fill a gap between both of the panels with the transparent resin filler; and a filled layer forming step of forming a layer filled with transparent resin by curing the transparent resin filler, wherein, in the supplying step, by dispensing and supplying the transparent resin filler from the supply means so that the transparent resin filler comes into contact with both of the image display panel and the front panel, a predetermined pattern is drawn, and the transparent resin filler is maintained in contact with both of the panels until drawing of the predetermined pattern is completed.

The transparent resin filler according to an embodiment of the present invention is a transparent resin filler which is filled between the image display panel and the front panel of the display device, and has a viscosity of 800 to 3500 mPa·s.

Advantageous Effects of Invention

According to an embodiment of the present invention, at the time of supplying resin, the transparent resin filler is kept in contact with both of the panels until drawing of a predetermined pattern is completed, therefore, even in a large display device, as well as a small display device, air bubbles can be prevented from remaining in the transparent resin filler.

BRIEF DESCRIPTION OF DRAWINGS

FIG. 5A is a sectional view showing a step in which a liquid crystal panel is stuck by suction to a liquid crystal panel holding stage while a protective panel is stuck by suction to a protective panel holding stage.
FIG. 5B is a sectional view showing a step of inserting the dispensing nozzle into a gap between the liquid crystal panel and the protective panel.
FIG. 5C is a sectional view showing a step of bringing the liquid crystal panel holding stage and the protective panel holding stage closer, and holding the liquid crystal panel and the protective panel with a predetermined gap.
FIG. 5D is a sectional view showing a step of dispensing an adhesive from the dispensing nozzle.
FIG. 5E is a sectional view showing a step of drawing a predetermined drawing pattern by dispensing an adhesive from the dispensing nozzle.

FIG. 5F is a sectional view showing a step of removing the dispensing nozzle from the gap between the liquid crystal panel and the protective panel.

FIG. 5G is a sectional view showing a step of pressing the liquid crystal panel and the protective panel to spread out the adhesive.

DESCRIPTION OF EMBODIMENTS

Figure 1:
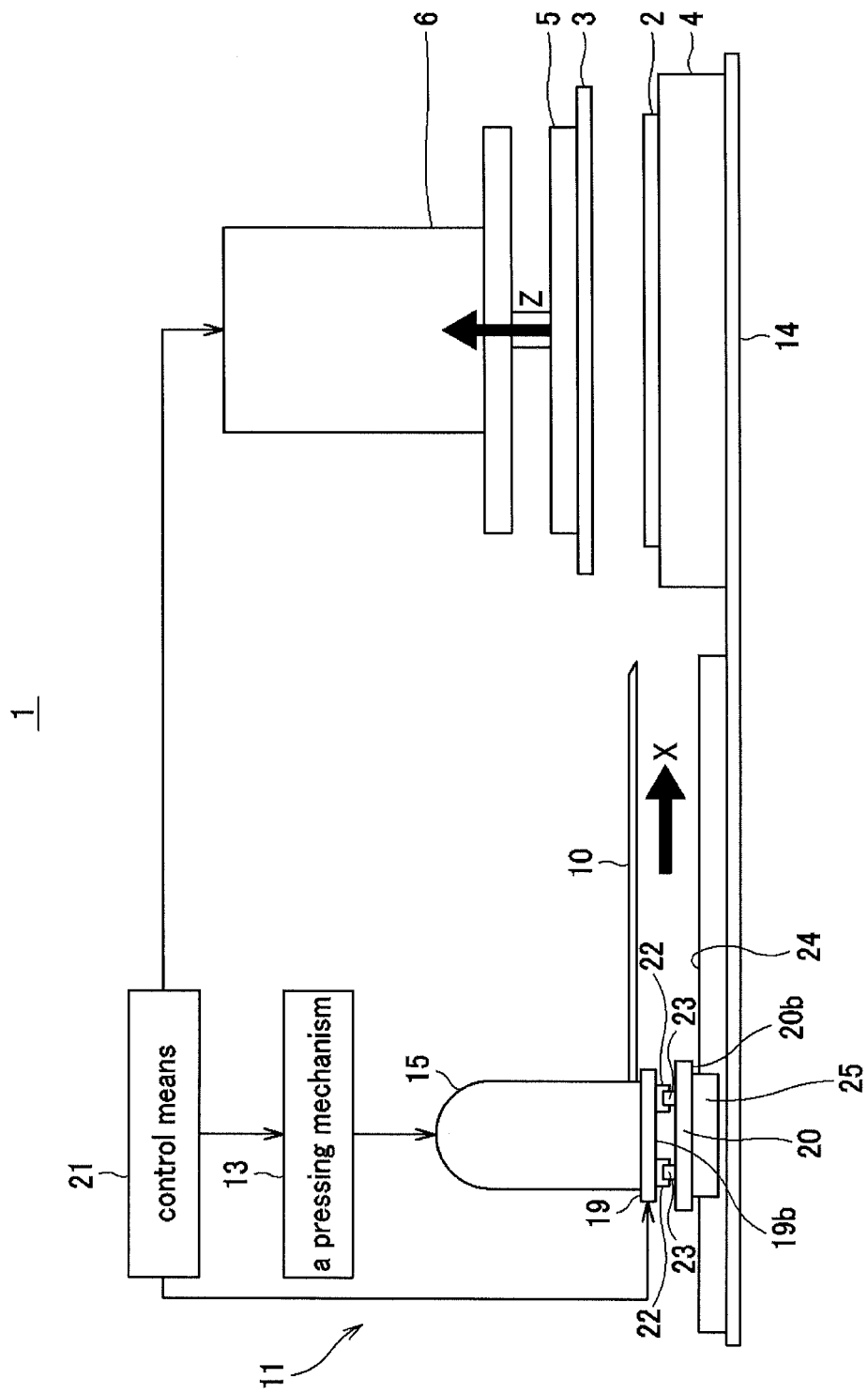
FIG. 1 is a side view showing a filling device.

Hereinafter, with reference to the drawings, a specific embodiment to which the present invention is applied will be described in detail in the following order.

1. Method for manufacturing display device
1-1. Filling device
1-2. Device operation
1-3. Another drawing pattern
1-4. Another device configuration
2. Transparent resin filler
3. Example

1. Method for Manufacturing Display Device

In a method for manufacturing a display device described as a specific embodiment of the present invention, an image display panel and a front panel are arranged with a predetermined gap, and supply means configured to dispense and supply a transparent resin filler is inserted between the image display panel and the front panel to supply a transparent resin filler from the supply means. Then, the image display panel or the front panel is pressed to fill a gap between both of the panels with the transparent resin filler, and a transparent resin filled layer is formed by curing the transparent resin filler. When the transparent resin filler is supplied by using the supply means, the transparent resin filler is dispensed and supplied from the supply means so that the transparent resin filler comes into contact with both of the image display panel and the front panel, whereby a predetermined pattern is drawn, and the transparent resin filler is kept in contact with both of the panels until the drawing of the predetermined pattern is completed. Thus, even in a large display device, as well as a small display device, air bubbles can be prevented from remaining in the transparent resin filler.

[1-1. Filling Device]

Next will be described a filling device for a transparent resin filler which is preferably used in the method for manufacturing a display device.

FIG. 1 is a side view showing the filling device. By using a liquid crystal panel 2 which is one of image display panels and a protective panel 3 which is a front panel to protect a surface of the liquid crystal panel 2 as a pair of plate-shaped objects, the filling device 1 fills a gap between the liquid crystal panel 2 and the protective panel 3 with an adhesive 7 as a transparent resin filler to bond together the liquid crystal panel 2 and the protective panel 3.

Figure 2:
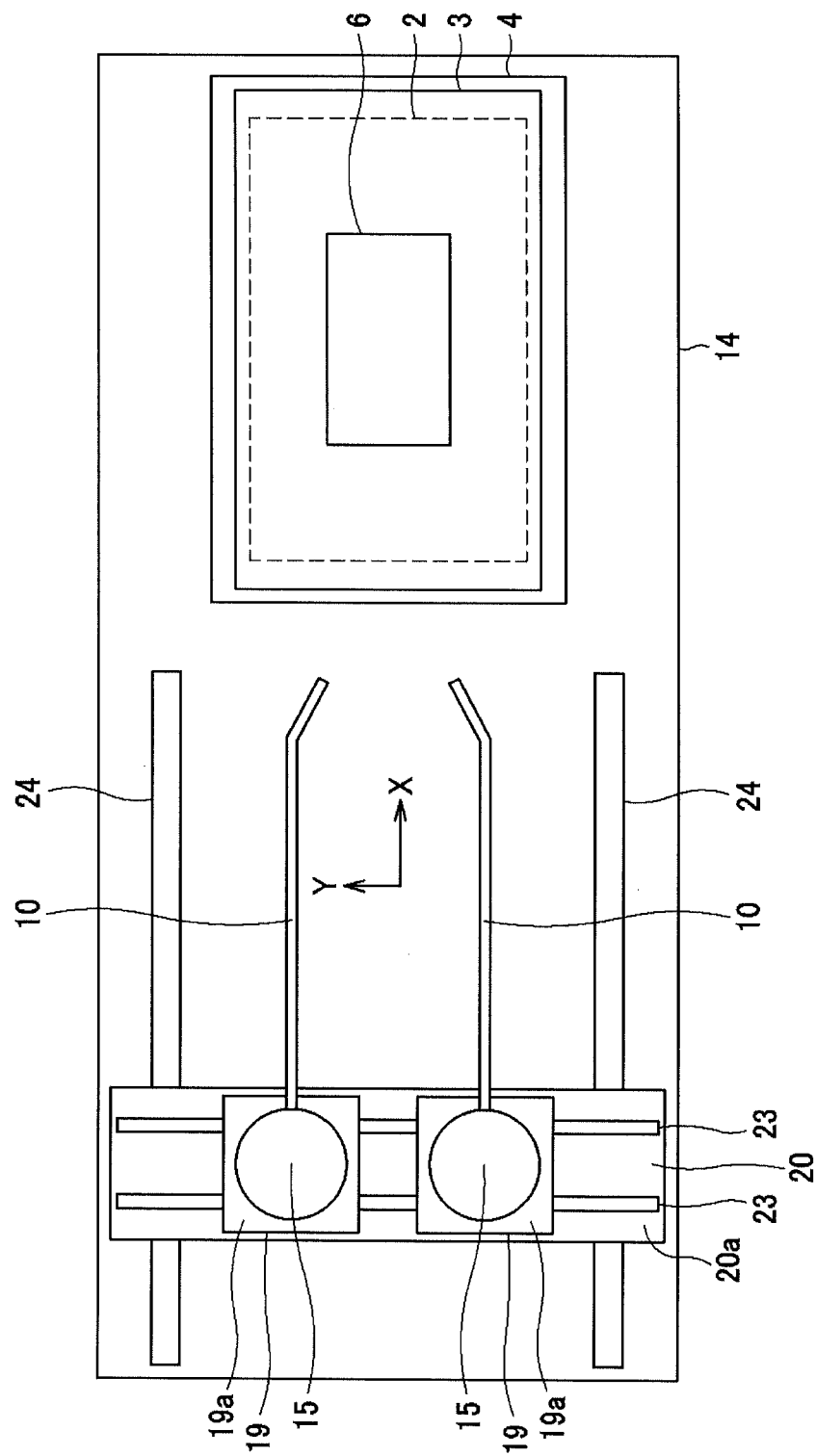
FIG. 2 is a plan view showing the filling device.

As shown in FIG. 1 and FIG. 2, the filling device 1 comprises a liquid crystal panel holding stage 4 to hold the liquid crystal panel 2, a protective panel holding stage 5 to hold the protective panel 3, an actuator 6 to move the liquid crystal panel 2 and the protective panel 3 apart and closer by moving up and down the protective panel holding stage 5, a dispensing nozzle 10 to be inserted between the liquid crystal panel 2 and the protective panel 3 as a supply means to dispense the adhesive 7, a nozzle moving mechanism 11 to move the dispensing nozzle 10, a syringe 15 which is connected to the dispensing nozzle 10 to store the adhesive 7, and a pressing mechanism 13 to dispense the adhesive 7 from a dispensing opening 17 of the dispensing nozzle 10, and these are arranged in a table 14.

The liquid crystal panel 2 is a liquid crystal cell in which liquid crystal is sealed between an upper and a lower glass substrate each of which is formed in a substantially rectangular shape, and the protective panel 3 is adhered to one of the substrates which faces a viewer side. The protective panel 3 improves viewability of the liquid crystal panel 2 and protects the liquid crystal panel 2 from impact and damage, and, for example, a transparent plate, such as a tempered glass plate and an acrylic plate, is used.

The liquid crystal panel holding stage 4 holding the liquid crystal panel 2 is fixed on the table 14, and hold the liquid crystal panel 2 by means such as vacuum suction, etc. so that a face to be bonded to the protective panel 3 faces the protective panel 3. The protective panel holding stage 5 holding the protective panel 3 is supported by the actuator 6 on the liquid crystal panel holding stage 4, and hold the protective panel 3 by means such as vacuum suction, etc. so that a face to be bonded to the liquid crystal panel 2 faces the liquid crystal panel 2. Moreover, the liquid crystal panel holding stage 4 and the protective panel holding stage 5 are configured that each of the sucking faces for the liquid crystal panel 2 or the protective panel 3 is set in a vertical direction, and a main face of each of the liquid crystal panel 2 and the protective panel 3 is held in a vertical direction.

The liquid crystal panel holding stage 4 and the protective panel holding stage 5 is preferably transparent in order to align the liquid crystal panel 2 and the protective panel 3, but may not be necessarily transparent, and the position alignment between the panels may be performed by known methods.

The actuator 6 which supports the protective panel holding stage 5 moves the protective panel holding stage 5 in the up-and-down directions, that is, in the direction of arrow Z and the opposite direction of arrow Z in FIG. 1. The actuator 6 moves up the protective panel holding stage 5 when each of the stages 4 and 5 is made to hold the liquid crystal panel 2 and the protective panel 3, while moves down the protective panel holding stage 5 when the adhesive 7 is filled in the gap of the liquid crystal panel 2 and the protective panel 3.

Moreover, by moving down the protective panel holding stage 5 at the time of filling of the adhesive 7, the actuator 6 holds the liquid crystal panel 2 and the protective panel 3 with a predetermined gap which enables the dispensing nozzle 10 described later to be inserted through and the adhesive 7 to be applied with keeping the adhesive 7 in contact with the liquid crystal panel 2 and the protective panel 3. Then, after the adhesive 7 is filled in, the actuator 6 moves further down the protective panel holding stage 5, presses the protective panel 3 toward the liquid crystal panel 2 at a predetermined pressure for a predetermined time, and spread out the adhesive over the whole surfaces of the liquid crystal panel 2 and the protective panel 3.

The dispensing nozzle 10 which dispenses the adhesive 7 between the liquid crystal panel 2 and the protective panel 3 has a cylindrical body in parallel to each of main faces of the liquid crystal panel 2 which is held at the liquid crystal panel holding stage 4 and the protective panel 3 which is held at the protective panel holding stage 5. Moreover, the dispensing nozzle 10 is coupled to a syringe 15 which supplies the adhesive 7, and thereby supported at a height which enables the dispensing nozzle 10 to move forward and backward inside the gap between the liquid crystal panel 2 and the protective panel 3, which are closely positioned each other, without contacting both of the panels. By the nozzle moving mechanism 11, the dispensing nozzle 10 moves in the opposite direction of arrow X in FIG. 1 and in the direction of arrow Y and the opposite direction of arrow Y in FIG. 2, and thereby draws a predetermined dispensing pattern described later inside the gap between the liquid crystal panel 2 and the protective panel 3.

Figure 3A:
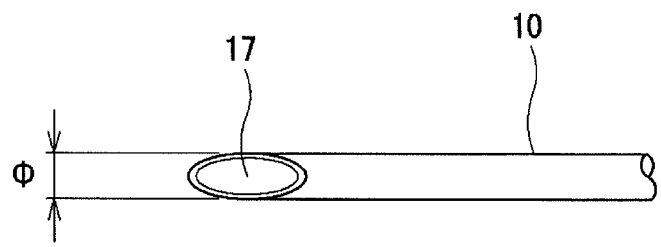
FIG. 3A is a plan view showing a tip of a dispensing nozzle.
Figure 3B:
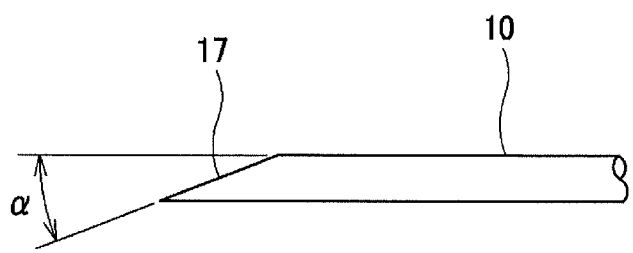
FIG. 3B is a side view showing the tip of the dispensing nozzle.
Figure 4:
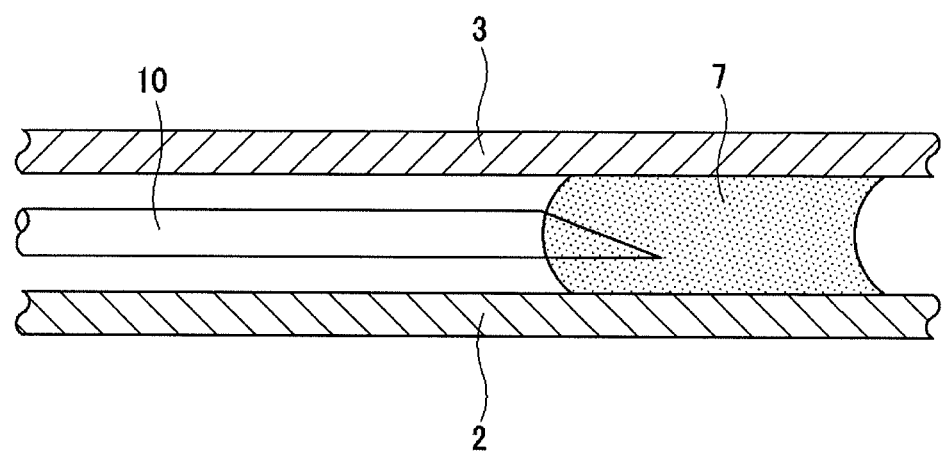
FIG. 4 is a sectional view showing the dispensing nozzle which is dispensing a filling liquid.

As shown in FIGS. 3A and 3B, an upper surface of a tip of the dispensing nozzle 10 is cut so that a dispensing opening 17 is directed upward in a vertical direction. Therefore, when the dispensing nozzle 10 begins to dispense the adhesive 7, the adhesives 7 is first made to adhere to the protective panel 3 positioned above, then, made to adhere to the liquid crystal panel 2 positioned below by gravity. Then, with dispensing the adhesive 7, the dispensing nozzle 10 moves inside the gap between the liquid crystal panel 2 and the protective panel 3, and as shown in FIG. 4, the adhesive 7 is applied, with keeping adhering to both sides of the liquid crystal panel 2 and the protective panel 3.

Thus, the filling device 1 makes the dispensing opening 17 of the dispensing nozzle 10 directed upward, and applies the adhesive 7 in such a manner that the adhesive 7 keeps adhering to both sides of the liquid crystal panel 2 and the protective panel 3, and thereby can prevent air bubbles from remaining in the adhesive 7.

In addition, as shown in FIG. 3A, the dispensing nozzle 10 is formed so as to have a diameter $\phi$ of, for example, 6 mm$\geq\phi\geq$2 mm. This diameter $\phi$ is determined depending on a gap between the liquid crystal panel 2 and the protective panel 3, and a value of a diameter $\phi$ is chosen so that the dispensing nozzle 10 does not come into contact with both of the panels. Moreover, the dispensing nozzle 10 is formed by using metal or industrial plastics, and has rigidity which enables the dispensing nozzle 10 to dispense the adhesive 7 without bending. That is, the dispensing nozzle 10 applies the adhesive 7 without coming into contact with the liquid crystal panel 2 and the protective panel 3.

Furthermore, as shown in FIG. 3B, the dispensing nozzle 10 is formed so as to have an angle $\alpha$ of the dispensing opening 17 of 90°>$\alpha\geq$30°. If the angle $\alpha$ is not less than 90°, the dispensing nozzle 10 is incapable of adhering the adhesive 7 to the protective panel 3 at the time of beginning to dispense, and the adhesive 7 remains in the dispensing opening 17, and thus the possibility that the adhesive adheres to unexpected portions arises. If the angle $\alpha$ is less than 30°, it becomes hard for the dispensing nozzle 10 to make the adhesive drop down to the liquid crystal panel 2 positioned below at the time of beginning to dispense, and thus the possibility that air bubbles are caught in arises. Specifically, the angle $\alpha$ is determined within an range of 90°>$\alpha\geq$30° depending on viscosity of the adhesive 7, and there is selected an angle which is suitable for making the adhesive 7 adhere to the protective panel 3 positioned above, adhere to the liquid crystal panel 2 without air bubbles being caught in, and dispensed with keeping in contact with both of the panels.

The nozzle moving mechanism 11 to move the dispensing nozzle 10 comprises a first nozzle stage 19 to mount the syringe 15, and a second nozzle stage 20 to mount a first nozzle stage 19. In the first nozzle stage 19, the syringe 15 is equipped on an upper surface 19$a$ while a slider 22 is installed into a lower surface 19$b$. The first nozzle stage 19 is movable in the direction of arrow Y and the opposite direction of arrow Y in FIG. 2 by sliding the slider 22 along a first guide rail 23 which is arranged in the second nozzle stage 20.

In the second nozzle stage 20, the first guide rail 23 to guide the first nozzle stage 19 is formed on the upper surface 20$a$, while the slider 25 which fits into the second guide rail 24 on the table 14 is formed on the lower surface 20$b$. The second nozzle stage 20 is movable in the direction of arrow X and the opposite direction of arrow X in FIG. 1 by sliding the slider 25 along a second first guide rail 24 which is formed on the table 14.

The filling device 1 is equipped with the two first nozzle stages 19, and applies the adhesive 7 by the two dispensing nozzles 10. The nozzle moving mechanism 11 has control means 21 to control the movement of the first nozzle stage 19 and the second nozzle stage 20, and moves the dispensing nozzle 10 in a substantially horizontal direction in conjunction with up-and-down movement of the liquid crystal panel holding stage 4 and the protective panel holding stage 5, and thereby, without making the dispensing nozzle 10 in contact with the liquid crystal panel 2 and the protective panel 3, inserts or remove the dispensing nozzle 10 into or from the gap between both of the panels.

It is note that the number of the dispensing nozzles 10 with which the filling device 1 is equipped is not limited to two but may be one or not less than three. Also in these cases, each of the dispensing nozzles 10 is coupled with a corresponding one of the syringes 15 which are mounted on the first nozzle stages 19, and each of the first nozzle stages 19 is slidably supported on the second nozzle stage 20.

The adhesive 7 dispensed from the dispensing nozzle 10 is stored in the syringe 15 which is mounted on the first nozzle stage 19. The syringe 15 is connected with the pressing mechanism 13 by which the adhesive 7 stored is dispensed from the dispensing nozzle 10, and thereby control of dispensing and stopping dispensing of the adhesive 7 and control of dispensing pressure are performed. For the pressing mechanism 13, for example, a compressed dry air cylinder is used, and supply and supply interruption of the gas to the inside of the syringe 15 and supply pressure are controlled by using the control means 21, and the adhesive 7 is dispensed from the dispensing nozzle 10 by supplying gas to the inside of the syringe 15 at a predetermined pressure.

As the adhesive 7 dispensed from the dispensing nozzle 10, used is an ultraviolet-softening-type transparent elastic resin whose refractive index is controlled so as not to decrease viewability of the liquid crystal panel 2 by inhibiting light scattering, even if the adhesive 7 is filled between the liquid crystal panel 2 and the protective panel 3.

There is selected a viscosity such that the adhesive 7 is capable of being filled with adhering to the liquid crystal panel 2 and the protective panel 3 simultaneously, and of being maintained adhering to both of the panels 2 and 3 without flowing out of outer edges of both of the panels 2 and 3. Moreover, depending on such viscosity of the adhesive 7, a gap dimension between the liquid crystal panel 2 and the protective panel 3 is set to a range of 2.5 mm to 10 mm.

[1-2. Device Operation]

Next, with reference to FIG. 5 and FIG. 6, operation of the filling device 1 will be described. It is note that, in the present embodiment, explained will be a case where the adhesives 7 is filled between a gap of the liquid crystal panel 2 and the protective panel 3 which are rectangular, but the shape of the liquid crystal panel 2 and the protective panel 3 is not limited to a rectangle.

Figure 6A:
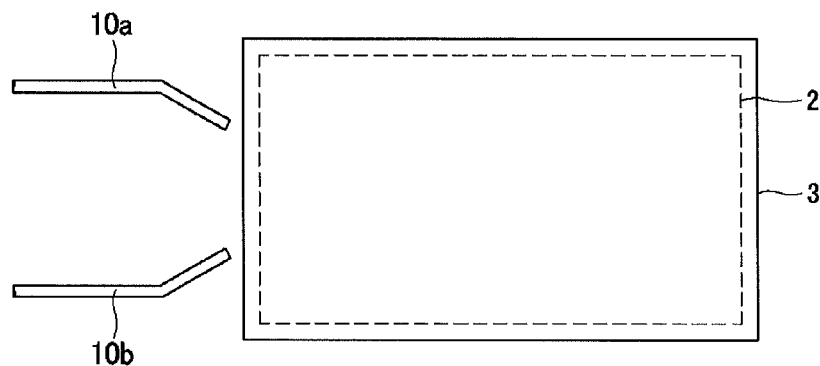
FIG. 6A is a plan view showing a step in which the liquid crystal panel is stuck by suction to the liquid crystal panel holding stage while the protective panel is stuck by suction to the protective panel holding stage.

First, in the filling device 1, the liquid crystal panel holding stage 4 and the protective panel holding stage 5 are spaced apart by the actuator 6, and the liquid crystal panel 2 is stuck by suction to the liquid crystal panel holding stage 4 while the protective panel 3 is stuck by suction to the protective panel holding stage 5 (FIG. 5A, FIG. 6A, arranging and inserting step).

The liquid crystal panel holding stage 4 and the protective panel holding stage 5 are, for example, transparent stages, and a mark for position alignment to make the liquid crystal panel 2 and the protective panel 3 face each other is formed in each of the stages. By using the marks for position alignment, the filling device 1 automatically or manually performs a predetermined position alignment to make the liquid crystal panel 2 and the protective panel 3 face each other.

At this time, the first nozzle stage 19 is moved in the opposite direction of arrow X in FIG. 1 by the control means, and the dispensing nozzle 10 is removed from a gap between the liquid crystal panel 2 and the protective panel 3 toward the opposite direction of arrow X.

Figure 6B:
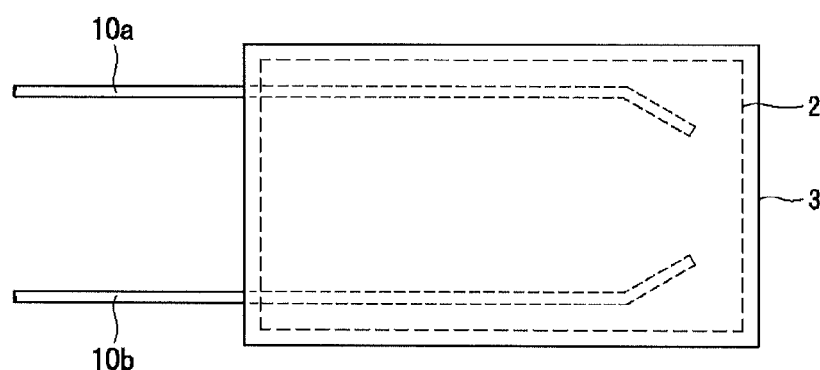
FIG. 6B is a plan view showing a step of inserting the dispensing nozzle into the gap between the liquid crystal panel and the protective panel.

After the position alignment of the liquid crystal panel 2 and the protective panel 3 is completed, the control means slides the two first nozzle stages 19 in the direction of arrow X, whereby the filling device 1 inserts each of the dispensing nozzles 10 into the gap from sides 2a and 3a each of which is one side in the long side direction of each of the liquid crystal panel 2 and the protective panel 4 (FIG. 5B, FIG. 6B, arranging and inserting step). At this time, the dispensing nozzles 10 are inserted in advance at a height where the nozzles do not come into contact with both of the panels when the liquid crystal panel 2 and the protective panel 4 come closer together (FIG. 5B, arranging and inserting step). Moreover, the dispensing openings 17 of the dispensing nozzles 10 are positioned in the vicinity of sides 2b and 3b each of which is the other side in the long side direction of each of the liquid crystal panel 2 and the protective panel 4 (FIG. 6B, arranging and inserting step).

Then, by operating the actuator 6, the filling device 1 brings the liquid crystal panel holding stage 4 and the protective panel holding stage 5 closer, and holds the liquid crystal panel 2 and the protective panel 4 with a predetermined gap (FIG. 5C, arranging and inserting step).

Figure 6C:
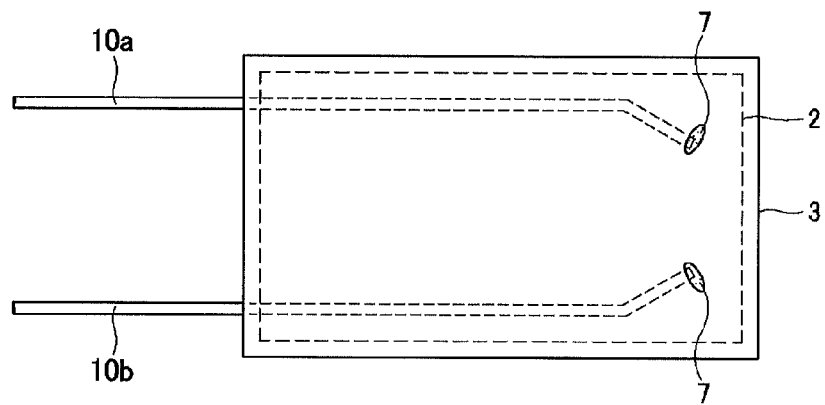
FIG. 6C is a plan view showing a step of dispensing an adhesive from the dispensing nozzle.

Next, with moving the first and the second nozzle stages 19 and 20 by the control means, the filling device 1 dispenses the adhesive 7 from the dispensing nozzle 10, and draws a predetermined filling pattern in the gap of the liquid crystal panel 2 and the protective panel 3 (FIG. 5D, FIG. 6C, supplying step). At this time, with moving in the opposite direction of arrow X, the direction of arrow Y, and the opposite direction of arrow Y, the dispensing nozzle 10 dispenses the adhesive 7. Therefore, the dispensing opening 17 of the dispensing nozzle 10 does not enter the adhesive 7 which is filled in the gap between the liquid crystal panel 2 and the protective panel 4, whereby the adhesive 7 is prevented from adhering to the nozzle body. Thus, the filling device 1 can prevent the adhesive 7 from adhering to an unexpected portion by the adhesive 7 adhering to the dispensing nozzle 10.

Figure 6D:
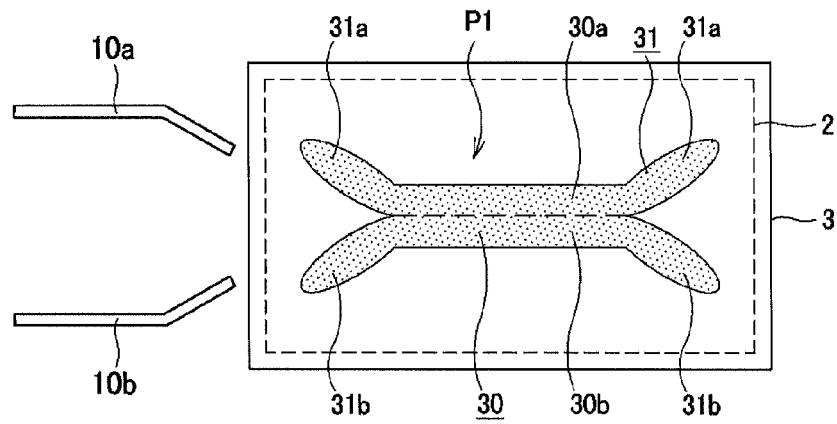
FIG. 6D is a plan view showing a step of drawing a predetermined drawing pattern by dispensing an adhesive from the dispensing nozzle.

As mentioned above, since the dispensing opening 17 is formed so as to direct upward, when beginning to dispense the adhesive 7, the dispensing nozzle 10 adheres the adhesive 7 to the protective panel 3 positioned above, then the adhesive 7 drops down to adhere to the liquid crystal panel 2 positioned below. Continuously, with moving in the opposite direction of arrow X, and in the direction of arrow Y and the opposite direction of arrow Y, the dispensing nozzle 10 dispenses the adhesive 7 to draw a predetermined drawing pattern P1 (FIG. 5E, FIG. 6D, supplying step). At this time, since the dispensing nozzle 10 applies the adhesive 7 with adhering the adhesive 7 to both of the liquid crystal panel 2 and the protective panel 3 simultaneously, air bubbles can be prevented from remaining in the adhesive 7.

As shown in FIG. 6D, the drawing pattern P1 of the adhesive 7 which is filled in the gap between the liquid crystal panel 2 and the protective panel 3 has a thick line portion 30 which is drawn in the central portion of the liquid crystal panel 2 and the protective panel 3 along the long side direction; and a thin line portion 31 which extends from both ends of the thick line portion 30 toward the four corners of each of the liquid crystal panel 2 and the protective panel 3. The thick line portion 30 is formed in the substantially central portion of the liquid crystal panel 2 and the protective panel 3 in the long side direction of the panels, while the thin line portion 31 is formed continuous from both ends of the thick line portion 30 in the long side direction toward the four corners of each of the liquid crystal panel 2 and the protective panel 3.

The drawing pattern P1 is formed by drawing a pattern symmetrical with respect to the thick line portion 30 in the short side direction, with one dispensing nozzle 10a and the other dispensing nozzle 10b of the filling device which is equipped with the two dispensing nozzles 10a and 10b. In other words, one dispensing nozzle 10a draws the thick line portion 30a and the thin line portion 31a in one side of the drawing pattern P1, while the other dispensing nozzle 10b draws the thick line portion 30b and the thin line portion 31b in the other side of the drawing pattern P1. The two dispensing nozzles 10a and 10b are synchronously moved by the nozzle moving mechanism 11, and, with moving back in the opposite direction of arrow X, each of the nozzles moves in the direction of arrow Y or the opposite direction of arrow Y so as to come closer together, thereby draws one thin line portion 31, and continuously moves back in the opposite direction of arrow X to draw the thick line portion 30, and, with further continuously moving back in the opposite direction of arrow X, the nozzles moves in the direction of arrow Y or the opposite direction of arrow Y to space apart together, thereby draws the other thin line portion 31.

It is note that the dispensing nozzle 10 is capable of drawing the thick line portion 30 and the thin line portion 31 differently by maintaining a constant dispensing amount of the adhesive 7 per unit time and controlling moving speed of the first and the second nozzle stages 19 and 20.

Thus, the drawing pattern P1 is formed from the thick line portions 30a and 30b, that is, central portion patterns positioned in the central portion of the liquid crystal panel 2 or the protective panel 3; and the thick line portions 31a and 31b, that is, corner portion patterns positioned in the corner portions of the liquid crystal panel 2 or the protective panel 3, and the thick line portions 30a and 30b, that is, central portion patterns. The thick line portions 31a and 31b, that is, corner portion patterns, are continuous or independent, whereby filling can be performed to every corner without air bubbles being mixed in.

When finishing forming a predetermined drawing pattern in the gap between the liquid crystal panel 2 and the protective panel 3, the filling device 1 operates the first and the second nozzle stages 19 and 20 by the control means 21 to remove the dispensing nozzle 10 from the gap of the liquid crystal panel 2 and the protective panel 3 (FIG. 5F, supplying step).

Figure 6E:
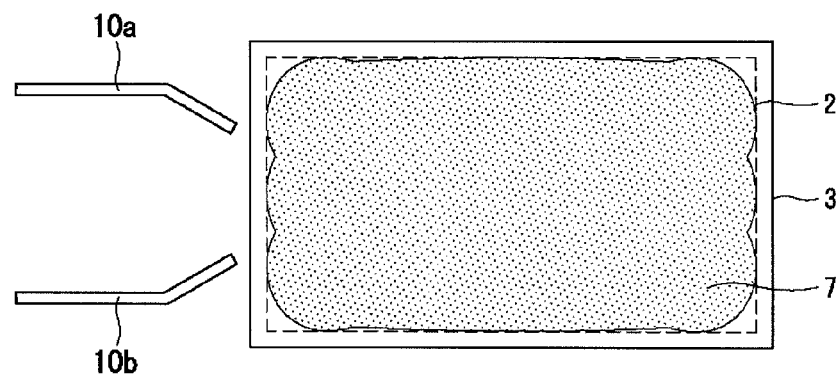
FIG. 6E is a plan view showing a step of pressing the liquid crystal panel and the protective panel to spread out the adhesive.

Then, the filling device 1 moves down the protective panel holding stage 4 by the actuator 6, and presses the liquid crystal panel 2 and the protective panel 3 to spread out the adhesive 7 (FIG. 5G, FIG. 6E, filling step). At this time, the pressing is carried out until a filled layer in which the adhesive 7 is filled has a predetermined thickness. Thus, the filling device 1 draws the drawing pattern P1 in a symmetrical form at the centers of both of the panels 2 and 3, whereby the adhesive spreads out uniformly over the whole of both of the panels 2 and 3. In addition, the filling device 1 forms the thin line portions 31 which extend toward the four corners of both of the panels 2 and 3, whereby the adhesive 7 spread out certainly until reaching the four corners of both of the panels 2 and 3. It is note that pressing pressure and pressing time by the actuator 6 are determined depending on a gap of the liquid crystal panel 2 and the protective panel 3, viscosity and an application amount of the adhesive 7, etc, and, for example, 2.5 kPa of pressing pressure and 0.3 seconds of pressing time may be set.

Figure 6F:
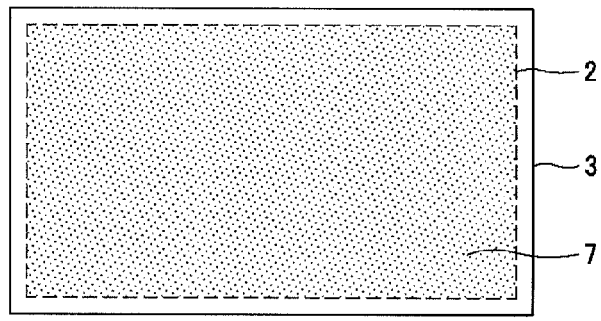
FIG. 6F is a plan view showing a step in which the adhesive is uniformly filled in every corner of the gap between the liquid crystal panel and the protective panel without protruding out of the gap.

Subsequently, the filling device 1 releases the pressing by the actuator 6, and releases the suction of the liquid crystal panel 4 by the liquid crystal panel holding stage 4 and the suction of the protective panel 3 by the protective panel holding stage 5, then leaves at normal pressure for a predetermined time, for example, 5 minutes. Thereby, the adhesive 7 is uniformly filled in every corner of the gap between the liquid crystal panel 2 and the protective panel 3 (FIG. 6F, filling step). After the adhesive 7 is filled in every corner of the gap, the filling device 1 performs a curing treatment of the adhesive 7 by irradiating with ultraviolet rays by using the ultraviolet irradiation device which is not illustrated (filled layer forming step).

Thus, the filling device 1 draws the drawing pattern P1 in a symmetrical form with a single stroke, thereby is capable of drawing the drawing pattern P1 which spreads uniformly in the shortest time.

[1-3. Another Drawing Pattern]

A pattern drawn by the filling device 1 is not limited to the pattern shown in FIG. 6D, but, depending on size of the liquid crystal panel 2 and the protective panel 3, viscosity of the adhesive 7, etc., a pattern in which air bubbles are not mixed in and the filling is performed in every corner for a predetermined time is selected. For example, a drawing pattern P2 shown in FIG. 7 has a main line portion 33 extending along the long side direction of the liquid crystal panel 2 and the protective panel 3 which are substantially rectangular; an oblique line portion 34 extending from both ends of the main line portion 33 toward the four corners; and a branch line portion 35 extending from the main line portion 33 in the short side direction of the liquid crystal panel 2 and the protective panel 3.

Figure 7:
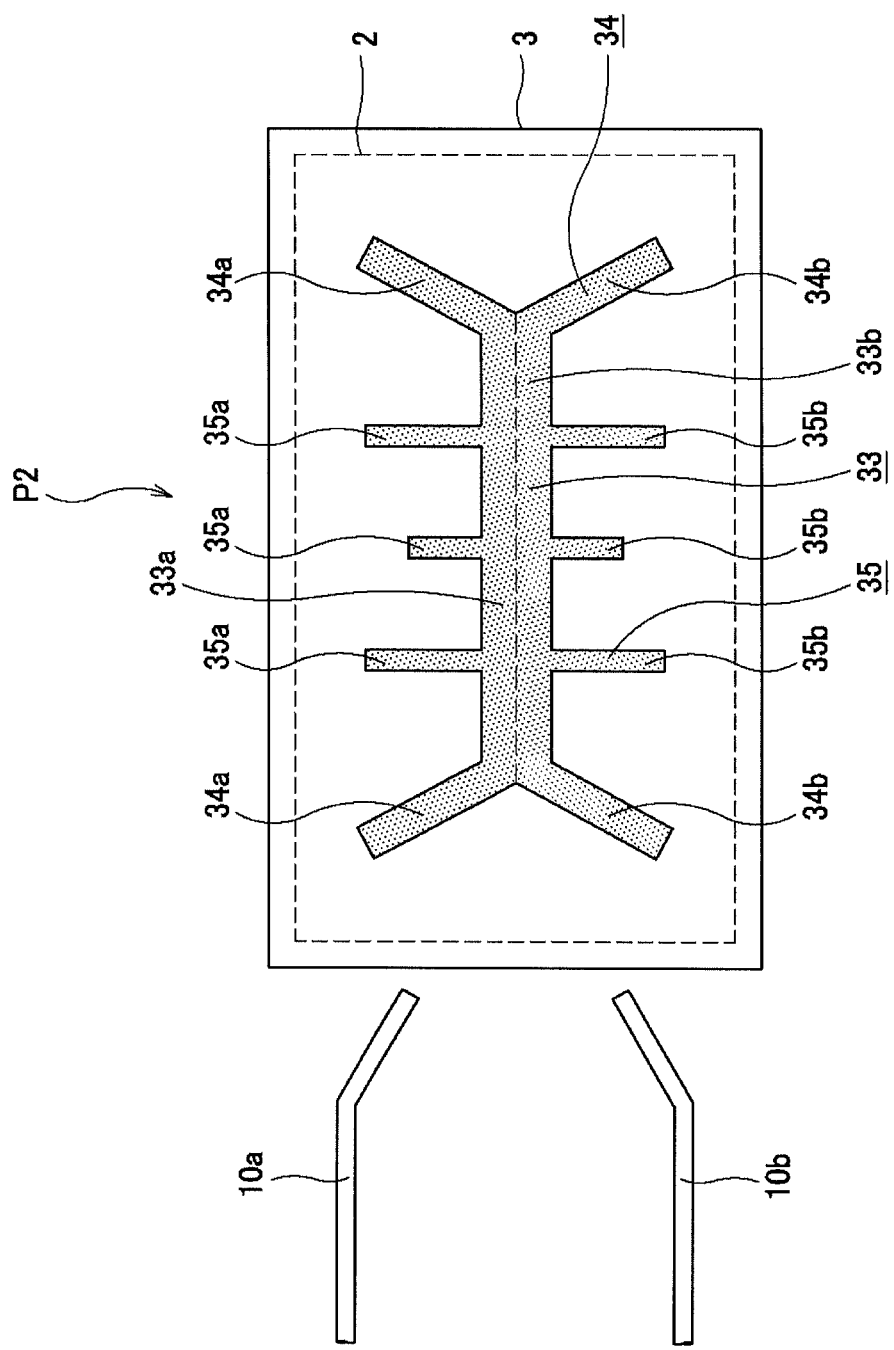
FIG. 7 is a plan view showing a drawing pattern by the filling device.

The drawing pattern P2 shown in FIG. 7 is formed by drawing a shape symmetrical with respect to the main line portion 33 in the short side direction by one dispensing nozzle 10a and the other dispensing nozzle 10b of the filling device which is equipped with the two dispensing nozzles 10a and 10b. That is, one dispensing nozzle 10a draws the main line portion 33a, the oblique line portion 34a, and the branch line portion 35a in one side of the drawing pattern P2, while the other dispensing nozzle 10b draws the main line portion 33b, the oblique line portion 34b, and the branch line portion 35b in the other side of the drawing pattern P2. The two dispensing nozzles 10 are synchronously moved by the nozzle moving mechanism 11, and thereby draw the drawing pattern P2 with the same timing.

In the drawing pattern P2, the main line portion 33 is constituted of a main line portion 33a and a main line portion 33b; the oblique line portion 34 extending from both sides of the main line portion 33 to the four corners is composed of a pair of oblique line portions 34a and a pair of oblique line portions 34b; and the branch line portion 35 extending from the main line portions 33 in the short side direction of the liquid crystal panel 2 and the protective panel 3 is composed of a plurality of branch line portions 35a extending from the main line portion 33a in one side of the short side direction of the liquid crystal panel 2 and the protective panel 3, and a plurality of branch line portions 35b extending from the main line portion 33b in the other side of the short side direction of the liquid crystal panel 2 and the protective panel 3.

In the drawing pattern P2, the number of the branch line portions 35 is determined depending on size of the liquid crystal panel 2 and the protective panel 3, and a total application amount of the adhesive 7 for the branch line portions 35 is not more than a combined application amount of the adhesive 7 for the main line portion 33 and the oblique line portion 34. In the drawing pattern P2, a plurality of branch line portions 35 extending in the short side direction of the liquid crystal panel 2 and the protective panel 3 is formed, and thereby, in the step of pressing by the actuator 6 and the step of leaving at a normal pressure for a predetermined time, the branch line portions 35 spread out quickly to side edges of the liquid crystal panel 2 and the protective panel 3, and the adhesive 7 is certainly filled in every corner.

In other words, depending on size of the liquid crystal panel 2 and the protective panel 3, the branch line portions 35a and 35b are formed so as to intersect with the main line portions 33a and 33b having a belt-like pattern extending straight, the branch line portions 35a and 35b having another belt-like pattern, whereby the adhesive 7 is certainly filled in every corner.

The two dispensing nozzles 10a and 10b are synchronously moved by the filling device 1, and thereby capable of drawing the drawing pattern P2 simultaneously, and applying the adhesive 7 in a short time. Moreover, the filling device 1 draws a symmetrical shape also in drawing pattern P2, whereby the adhesive 7 can be uniformly filled over the whole of both of the panels 2 and 3.

It is note that, depending on panel shape, the filling device 1 does not necessarily have to draw the drawing pattern P in a symmetrical shape. Moreover, the filling device 1 may draw the drawing pattern P in a symmetrical shape by moving one dispensing nozzle 10. The filling device 1 may draw a symmetrical shape of the drawing pattern P which has at least one contact point to be a symmetry point. Furthermore, for example, when the adhesive 7 is applied to circular panels 2 and 3, the filling device 1 may form a circular drawing pattern P in the center of the panels 2 and 3.

[1-4. Another Device Configuration]

The nozzle moving mechanism 11 may have a plurality of the dispensing nozzles 10, and insert the nozzles from sides of the liquid crystal panel 2 and the protective panel 3 in a gap, the sides facing each other. When the liquid crystal panel 2 and the protective panel 3 are larger, for example, have a size equivalent to a liquid crystal display television of 12 inches or more, as shown in FIG. 8, the dispensing nozzles 10 and the nozzle moving mechanisms 11 are disposed in both sides where the dispensing nozzles 10 facing each other, and the adhesive 7 is applied simultaneously, whereby the time necessary to apply the adhesive 7 can be shortened.

Figure 8:
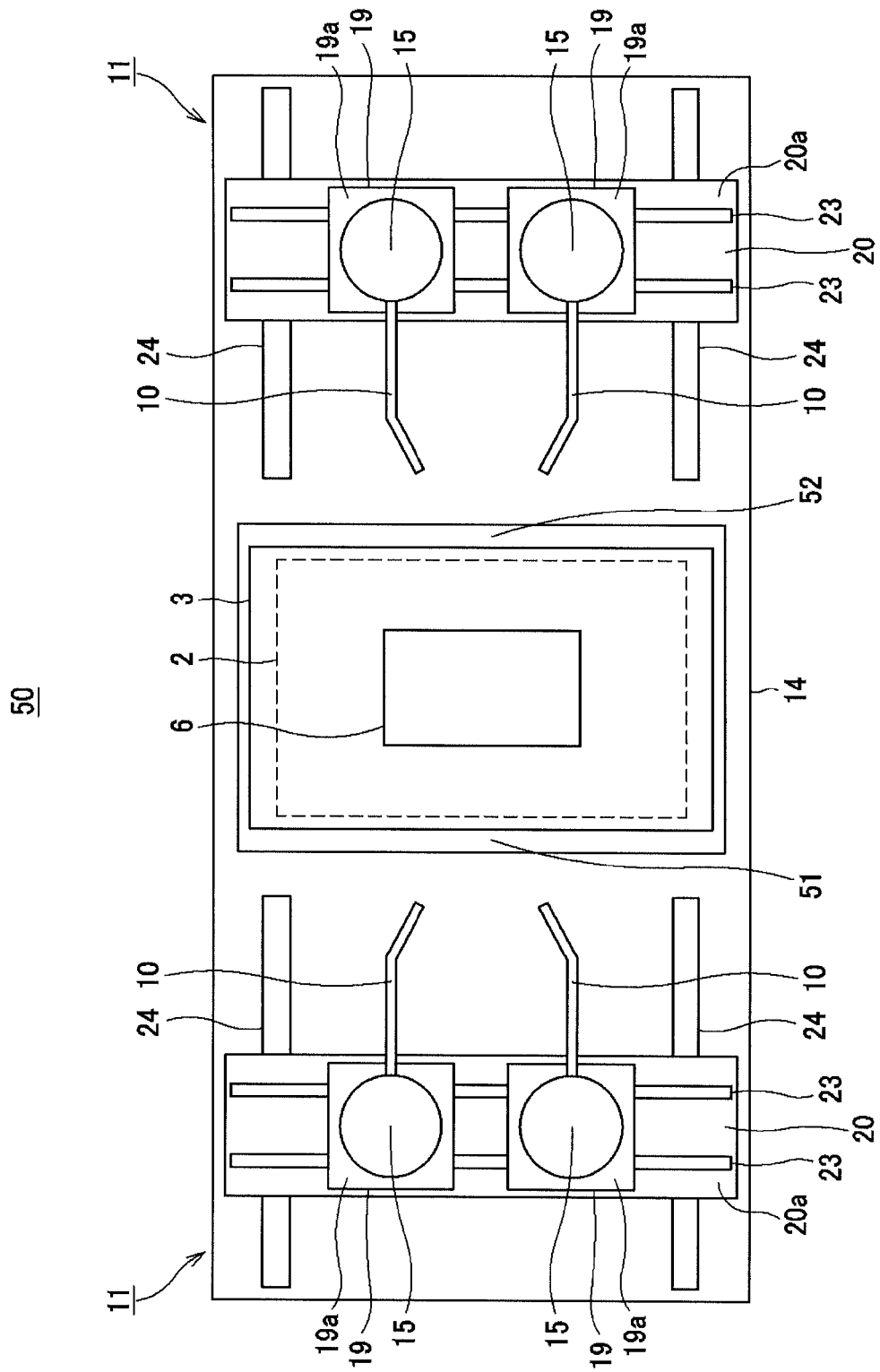
FIG. 8 is a plan view showing another filling device.

In other words, the filling device 50 shown in FIG. 8 is equipped with the two dispensing nozzles 10 and the nozzle moving mechanism 11 which moves the two dispensing nozzles 10, in each side of the short side direction of the liquid crystal panel 2 and the protective panel 3 each of which is rectangular. In an application step of the adhesive 7, the filling device 50 inserts the two dispensing nozzles 10 from each of one side 51 and the other side 52 in the short side direction, and draws a predetermined drawing pattern P.

At this time, each of the dispensing nozzles 10 is synchronously moved from the substantially central portion of both of the panels 2 and 3 toward the direction of one side 51 or the other side 52 which are insertion edges, and along the long side direction of both of the panels 2 and 3. When drawing is completed, each of the dispensing nozzles 10 is removed from one side 51 or the other side 52 which are insertion edges.

Thus, by inserting a plurality of the dispensing nozzles 10 from opposite sides of the image panel and the front panel which are rectangular, the nozzle moving mechanism 11 is capable of moving a plurality of the dispensing nozzles 10 via the shortest route, and thereby, even in a large-sized panel, drawing a predetermined drawing pattern P in a short time.

Meanwhile, when the adhesive 7 is filled in a gap of the liquid crystal panel 2 and the protective panel 3 of relatively small or medium size, as shown in FIGS. 6A and 6B, it is enough to provide one or a plurality of the dispensing nozzles 10 in one side of the long side direction of the liquid crystal panel 2 and the protective panel 3 which are rectangular. Of course, even when the adhesive 7 is filled in a gap of the liquid crystal panel 2 and the protective panel 3 of small or medium size, one or a plurality of the dispensing nozzles 10 may be provided in both sides of the long side direction of the liquid crystal panel 2 and the protective panel 3 which are rectangular.

As mentioned above, the filling device which fills a gap between two plate-shaped objects with the adhesive 7 to bond the plate-shaped objects together was explained, but the filling device according to the present invention may hold not less than three plate-shaped objects so that each of the main faces of the objects faces each other, and fill each gap between the plate-shaped objects with filling liquid such as the adhesive 7.

In this case, in the filling device, holding means to hold plate-shaped object constituting an intermediate layer other than plate-shaped objects constituting a top layer and a bottom layer grasps side edges of said plate-shaped object since both of main faces of said plate-shaped object are open. Moreover, the filling device may have dispensing nozzles which fill each gap of plate-shaped objects with filling liquid and moving mechanisms of the dispensing nozzles in every gap of the plate-shaped objects. In this case, a plurality of dispensing nozzles which fills each of different gaps with filling liquid and moving mechanisms may be arranged in each of different sides of rectangular plate-shaped objects. In addition, the filling device may perform moving operation of a dispensing nozzle so that one dispensing nozzle fills a plurality of gaps with filling liquid.

2. Transparent Resin Filler

As mentioned above, until supply means which is inserted between both of the panels, that is, an image display panel and a front panel, completes to draw a predetermined pattern, a transparent resin filler according to the present embodiment is maintained in contact with both of the panels. The viscosity of such transparent resin filler has a range of 800 to 3500 mPa·s. Thus, even if a gap between the image display panel and the front panel is in a range of 2.5 to 5.5 mm, a state where the supply means is in contact with both of the panels can be maintained.

Moreover, a transparent resin filler preferably contains a photoreactive acrylate material, such as polyurethane acrylate, isobornyl acrylate, etc., and a photopolymerization initiator, as base resin.

A preferred example of a resin composition contains at least one kind of polymer, such as polyurethane acrylate, polyisoprene acrylate or an ester compound thereof, hydrogenated terpene resin, and butadiene polymer; at least one kind of acrylate monomer, such as isobornyl acrylate, dicyclopentenyloxyethyl methacrylate, and 2-hydroxybutyl methacrylate; and a photopolymerization initiator, such as 1-hydroxy-cyclohexyl-phenyl-ketone. Other additives, for example, a sensitizer, a plasticizer, transparent particles, etc. may be added within the scope of the purpose of the present invention.

With such transparent resin filler, a state where the transparent resin filler is in contact with both of the panels can be maintained until drawing of a predetermined pattern is completed in the Gap-Dispense method, and, even in a large-sized display device as well as a small-sized display device, air bubbles can be prevented from remaining in the transparent resin filler. Moreover, viewability and impact resistance of a display device can be improved.

EXAMPLE

3. Example

Hereinafter, the present invention will be specifically described by way of Example. In the Example, a relation between viscosity of a transparent resin filler and a Gap size between both of the panels was verified. It is note that the present invention is not limited to the following Example.

[Resin 1]

40 parts by mass of an ester compound formed from a maleic anhydride adduct of polyisoprene polymer and 2-hydroxyethyl methacrylate (trade name: UC102, manufactured by KURARAY Co., Ltd., molecular weight 12500), 35 parts by mass of dicyclopentenyloxy ethyl methacrylate (trade name: FA512M, manufactured by Hitachi Chemical Co., Ltd.), 3 parts by mass of 2-hydroxypropyl methacrylate (trade name: LIGHT ESTER HOP, manufactured by Kyoeisha Chemical Co., Ltd.), 3 parts by mass of acryloyl morpholine (trade name: ACMO, manufactured by KOHJIN Co., Ltd.), 15 parts by mass of benzyl acrylate (trade name: Biscoat#160, manufactured by Osaka Organic Chemica Industry Ltd.), 35 parts by mass of hydrogenated terpene resin (trade name: Clearon P-85, manufactured by YASUHARA CHEMICAL Co., Ltd.), 120 parts by mass of butadiene polymer (trade name: Polyoil 110, manufactured by ZEON CORPORATION), 0.3 parts by mass of hindered phenolic antioxidant (trade name: IRGANOX 1520L, manufactured by Ciba Specialty Chemicals Inc.), 0.5 parts by mass of a photopolymerization initiator (trade name: SpeedCure TPO, manufactured by Nihon SiberHegner K.K.), and 4 parts by mass of a photopolymerization initiator (trade name: IRGACURE 184D, manufactured by Ciba Specialty Chemicals Inc.) were kneaded by a kneader to prepare Resin 1.

[Resin 2]

50 parts by mass of an ester compound formed from a maleic anhydride adduct of polyisoprene polymer and 2-hydroxyethyl methacrylate (trade name: UC102, manufactured by KURARAY Co., Ltd., molecular weight 12500), 28 parts by mass of dicyclopentenyloxy ethyl methacrylate (trade name: FA512M, manufactured by Hitachi Chemical Co., Ltd.), 7 parts by mass of 2-hydroxypropyl methacrylate (trade name: LIGHT ESTER HOP, manufactured by Kyoeisha Chemical Co., Ltd.), 15 parts by mass of benzyl acrylate (trade name: Biscoat#160, manufactured by Osaka Organic Chemica Industry Ltd.), 56 parts by mass of hydrogenated terpene resin (trade name: Clearon P-85, manufactured by YASUHARA CHEMICAL Co., Ltd.), 100 parts by mass of butadiene polymer (trade name: Polyoil 110, manufactured by ZEON CORPORATION), 0.3 parts by mass of hindered phenolic antioxidant (trade name: IRGANOX 1520L, manufactured by Ciba Specialty Chemicals Inc.), 0.5 parts by mass of a photopolymerization initiator (trade name. SpeedCure TPO, manufactured by Nihon SiberHegner K.K.), and 4 parts by mass of a photopolymerization initiator (trade name: IRGACURE 184D, manufactured by Ciba Specialty Chemicals Inc.) were kneaded by a kneader to prepare Resin 2.

[Resin 3]

50 parts by mass of an ester compound formed from a maleic anhydride adduct of polyisoprene polymer and 2-hydroxyethyl methacrylate (trade name: UC203, manufactured by KURARAY Co., Ltd., molecular weight 25000), 30 parts by mass of dicyclopentenyloxy ethyl methacrylate (trade name: FA512M, manufactured by Hitachi Chemical Co., Ltd.), 6 parts by mass of 2-hydroxypropyl methacrylate (trade name: LIGHT ESTER HOP, manufactured by Kyoeisha Chemical Co., Ltd.), 15 parts by mass of benzyl acrylate (trade name: Biscoat#160, manufactured by Osaka Organic Chemica Industry Ltd.), 30 parts by mass of hydrogenated terpene resin (trade name: Clearon P-85, manufactured by YASUHARA CHEMICAL Co., Ltd.), 120 parts by mass of butadiene polymer (trade name: Polyoil 110, manufactured by ZEON CORPORATION), 0.3 parts by mass of hindered phenolic antioxidant (trade name: IRGANOX 1520L, manufactured by Ciba Specialty Chemicals Inc.), 0.5 parts by mass of a photopolymerization initiator (trade name: SpeedCure TPO, manufactured by Nihon SiberHegner K.K.), and 4 parts by mass of a photopolymerization initiator (trade name: IRGACURE 184D, manufactured by Ciba Specialty Chemicals Inc.) were kneaded by a kneader to prepare Resin 3.

[Resin 4]

70 parts by mass of an ester compound formed from a maleic anhydride adduct of polyisoprene polymer and 2-hydroxyethyl methacrylate (trade name: UC203, manufactured by KURARAY Co., Ltd., molecular weight 25000), 30 parts by mass of dicyclopentenyloxy ethyl methacrylate (trade name: FA512M, manufactured by Hitachi Chemical Co., Ltd.), 10 parts by mass of 2-hydroxypropyl methacrylate (trade name: LIGHT ESTER HOP, manufactured by Kyoeisha Chemical Co., Ltd.), 30 parts by mass of hydrogenated terpene resin (trade name: Clearon P-85, manufactured by YASUHARA CHEMICAL Co., Ltd.), 140 parts by mass of butadiene polymer (trade name: Polyoil 110, manufactured by ZEON CORPORATION), 0.3 parts by mass of hindered phenolic antioxidant (trade name: IRGANOX 1010, manufactured by Ciba Specialty Chemicals Inc.), 0.5 parts by mass of a photopolymerization initiator (trade name: SpeedCure TPO, manufactured by Nihon SiberHegner K.K.), and 4 parts by mass of a photopolymerization initiator (trade name: IRGACURE 184D, manufactured by Ciba Specialty Chemicals Inc.) were kneaded by a kneader to prepare Resin 4.

[Viscosity Measurement]

Viscosity of the transparent resin fillers (Resin 1 to 4) was measured by using a rheometer PK100 made by HAAK. The results were that the viscosity of Resin 1, Resin 2, Resin 3, and Resin 4 was 800 mPa·s, 1500 mPa·s, 2000 mPa·s, and 3500 mPa·s, respectively. Table 1 shows the measurement results of a blending amount and viscosity of each of the resins.

TABLE 1

|  | Resin 1 | Resin 2 | Resin 3 | Resin 4 |
| --- | --- | --- | --- | --- |
| UC102 | 40 | 50 | — | — |
| UC203 | — | — | 50 | 70 |
| FA512M | 35 | 28 | 30 | 30 |
| HOP | 3 | 7 | 6 | 10 |
| ACMO | 3 | — | — | — |
| #160 | 15 | 15 | 10 | — |
| P-85 | 35 | 56 | 30 | 30 |
| Polyoil110 | 120 | 100 | 120 | 140 |
| IRGANOX1010 | — | — | — | 0.3 |
| IRGANOX1520L | 0.3 | 0.3 | 0.3 | — |
| TPO | 0.5 | 0.5 | 0.5 | 0.5 |
| IRAGACURE 184D | 4 | 4 | 4 | 4 |
| Total(parts of mass) | 255.8 | 260.8 | 250.8 | 284.8 |
| Viscosity(mPa · s) | 800 | 1500 | 2000 | 3500 |

[Verification of Correlation Between Viscosity and Gap Size]

A correlation between viscosity of the transparent resin fillers and Gap size between both of the panels was verified. With securing a predetermined Gap size, two transparent substrates were arranged in parallel, and a needle was inserted between the Gap, then 100 mg of the transparent resin fillers (Resin 1 to 4) having predetermined viscosity were dispensed so as to come into contact with both of the transparent substrates. Two minutes later, it was visually observed whether or not separation of the contact occurred. The Gap size was set to not less than 2.5 mm, which is enough to allow a needle inserted, and it was verified by 0.25 mm pitch whether or not separation of the contact occurred.

Figure 9:
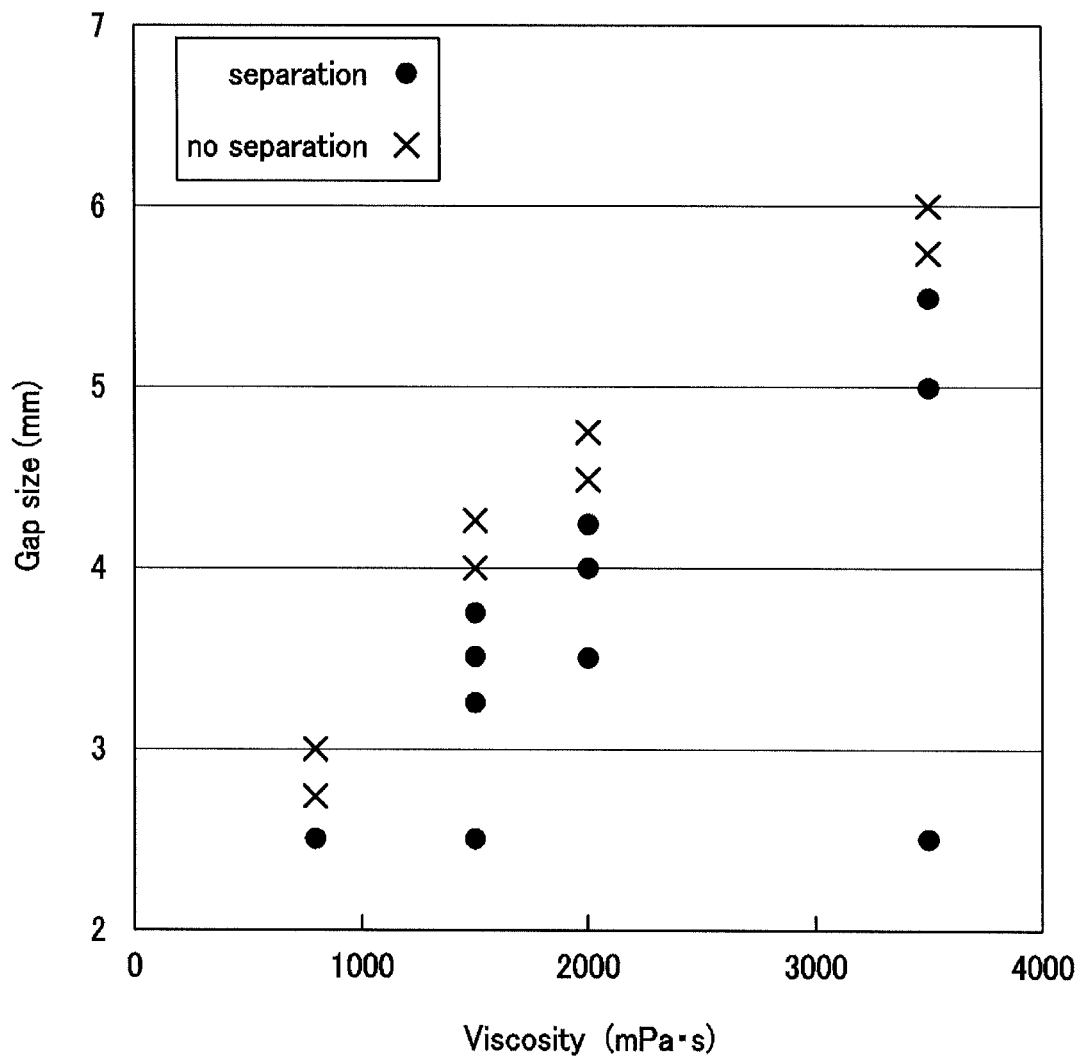
FIG. 9 is a graph showing verification results of viscosity and Gap size.

FIG. 9 is a graph showing the verification results of viscosity and Gap size. In this figure, ○ represents the case where separation of the contact from the upper and lower substrates did not occur 2 minutes after the dispensing, while X represents the case where separation of the contact occurred. Resin 1 having 800 mPa·s viscosity was able to be maintained in contact with both of the transparent substrates when a Gap size was not more than 2.5 mm. Resin 2 having 1500 mPa·s viscosity was able to be maintained in contact with both of the transparent substrates when a Gap size was not more than 3.75 mm. Resin 3 having 2000 mPa·s viscosity was able to be maintained in contact with both of the transparent substrates when a Gap size was not more than 4.25 mm Resin 4 having 3500 mPa·s viscosity was able to be maintained in contact with both of the transparent substrates when a Gap size was not more than 5.5 mm.

In other words, it was found that, in the case where resin viscosity was in a range of 800 to 3500 mPa·s when a gap between the image display panel and the front panel was 2.5 to 5.5 mm, a state where the transparent resin filler was in contact with both of the panels was able to be maintained.

REFERENCE SIGNS LIST 1, 50 filling device, 2 liquid crystal panels, 3 protective panel, 4 liquid crystal panel holding stage, 5 protection panel holding stage, 6 actuator, 10 dispensing nozzle, 11 nozzle moving mechanism, 13 pressing mechanism, 14 table, 15 syringe, 17 dispensing opening, 19 first nozzle stage, 20 second nozzle stage, 21 control means, 22 slider, 23 first guide rail, 24 second guide rail, 25 slider, 30 thick line portion, 31 thin line portion, 33 main line portion, 34 oblique line portion, 35 branch line portion

The invention claimed is:

1. A method for manufacturing a display device, the method comprising:

inserting a dispensing nozzle between an image display panel and a front panel of the display device;

supplying a transparent resin filler from the dispensing nozzle to form a predetermined pattern such that the predetermined pattern contacts both the image display panel and the front panel;

pressing the image display panel or the front panel at a pressure greater than a normal pressure;

spreading the transparent resin filler to fill a gap between the panels by subjecting the resin filler to the normal pressure; and forming a transparent resin filled layer by curing the transparent resin filler.

2. The method for manufacturing the display device according to claim 1, wherein, when the predetermined gap ranges from 2.5 to 5.5 mm, a viscosity of the transparent resin filler ranges from 800 to 3500 mPa·s.

3. The method for manufacturing the display device according to claim 2, wherein the transparent resin filler comprises a photoreactive acrylate material and a photopolymerization initiator.

4. The method for manufacturing the display device according to claim 3, wherein the predetermined pattern comprises a central portion pattern that is positioned in a central portion of the image display panel or the front panel and a corner portion pattern that is positioned in a corner portion of the image display panel or the front panel.

5. The method for manufacturing the display device according to claim 4, wherein the central portion pattern is a belt-like pattern that extends linearly and that intersects a second belt-like pattern.

6. The method for manufacturing the display device according to claim 1, wherein, the pressing is performed until the transparent resin filled layer has a predetermined thickness.

7. The method for manufacturing the display device according to claim 1, wherein the inserting inserts a plurality of dispensing nozzles from opposite sides of the image panel and the front panel, and wherein the panels are rectangular.

8. The method according to claim 1, wherein the pressing fills an entirety of the gap.

9. The method according to claim 4, wherein the central portion pattern contacts the corner portion pattern.

10. The method according to claim 4, wherein the central portion pattern and the corner portion pattern are continuously drawn.

11. The method according to claim 4, wherein the central portion pattern and the corner portion pattern are independently drawn.

* * * * *